US012604330B2

(12) United States Patent (10) Patent No.: US 12,604,330 B2
He et al. (45) Date of Patent: Apr. 14, 2026

(54) MULTI-BEAM TECHNIQUES FOR SMALL DATA TRANSFER OVER PRECONFIGURED UPLINK RESOURCES

(71) Applicant: QUALCOMM Incorporated, San Diego, CA (US)

(72) Inventors: Linhai He, San Diego, CA (US); Jing Lei, San Diego, CA (US); Ruiming Zheng, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 545 days.

(21) Appl. No.: 18/002,430

(22) PCT Filed: Aug. 6, 2020

(86) PCT No.: PCT/CN2020/107387
§ 371 (c)(1),
(2) Date: Dec. 19, 2022

(87) PCT Pub. No.: WO2022/027429
PCT Pub. Date: Feb. 10, 2022

(65) Prior Publication Data
US 2023/0269762 A1 Aug. 24, 2023

(51) Int. Cl.
*H04W 72/53* (2023.01)
*H04W 56/00* (2009.01)
*H04W 72/044* (2023.01)

(52) U.S. Cl.
CPC ....... *H04W 72/53* (2023.01); *H04W 56/0015* (2013.01); *H04W 72/046* (2013.01)

(58) Field of Classification Search
CPC ............. H04W 72/53; H04W 56/0015; H04W 72/046; H04W 72/115; H04W 72/1268;
(Continued)

(56) References Cited

U.S. PATENT DOCUMENTS 11,658,786 B2 5/2023 He et al.
2017/0171842 A1 6/2017 You et al.
(Continued)

FOREIGN PATENT DOCUMENTS

CN 109952747 A 6/2019
CN 110611953 A 12/2019
(Continued)

OTHER PUBLICATIONS

Asutek: "Discussion on PUR Resource Configuration in Respect to Radio Condition", 3GPP TSG-RAN WG2 Meeting #106, 3GPP Draft, R2-1906550, Discussion on PUR Resource Configuration in Respect to Radio Condition, 3rd Generation Partnership Project (3GPP), Mobile Competence Centre, 650, Route Des Lucioles, F-06921, Sophia-Antipolis Cedex, France, vol. RAN WG2, No. Reno, USA, May 13, 2019-May 19, 2019, May 13, 2019 (May 13, 2019), 3 pages, XP051730011, Section 2, the whole document.
(Continued)

*Primary Examiner* — Chae S Lee
(74) *Attorney, Agent, or Firm* — Norton Rose Fulbright US LLP

(57) ABSTRACT

Wireless communication techniques that include multi-beam techniques for small data transfer (SDT) over preconfigured uplink resources (PURs) are discussed. A UE may receive an indication of at least one PUR allocated for uplink communication when the UE does not have a RRC connection with a base station. The at least one PUR may include one or more distinct PUR occasions. The UE may also receive an indication of one or more distinct SSBs associated with the one or more distinct PUR occasions. Each PUR occasion of the one or more distinct PUR occasions may be associated with only one SSB of the one or more distinct SSBs. The CE may also transmit information to the base station during a PUR occasion associated with an SSB that
(Continued)

is associated with a RSRP that is greater than a threshold. Other aspects and features are also claimed and described.

34 Claims, 7 Drawing Sheets

(58) Field of Classification Search
CPC ............... H04W 72/542; H04W 56/00; H04W 56/0005; H04W 72/23; Y02D 30/70; H04L 5/0092; H04L 5/0044; H04B 7/0695; H04B 17/318
See application file for complete search history.

(56) References Cited

U.S. PATENT DOCUMENTS

| | | | | |
|---|---|---|---|---|
| 2019/0254073 | A1 | 8/2019 | Sheng et al. | |
| 2019/0297537 | A1 | 9/2019 | Tsai et al. | |
| 2020/0107396 | A1 | 4/2020 | Wang et al. | |
| 2020/0170069 | A1 | 5/2020 | Shih et al. | |
| 2020/0229161 | A1 | 7/2020 | Raghavan et al. | |
| 2021/0315049 | A1 | 10/2021 | Wei et al. | |
| 2021/0337602 | A1 | 10/2021 | Liu et al. | |
| 2022/0022247 | A1 | 1/2022 | Agiwal et al. | |
| 2022/0045736 | A1* | 2/2022 | Hu | H04W 56/001 |
| 2022/0061080 | A1 | 2/2022 | Takeda et al. | |
| 2022/0159593 | A1* | 5/2022 | Jeon | H04W 76/30 |
| 2022/0174679 | A1* | 6/2022 | Shih | H04W 72/53 |
| 2022/0232594 | A1* | 7/2022 | Park | H04W 76/10 |
| 2023/0120096 | A1* | 4/2023 | Kim | H04W 48/20 |
| | | | | 370/329 |
| 2024/0333405 | A1 | 10/2024 | He et al. | |

FOREIGN PATENT DOCUMENTS

| | | | |
|---|---|---|---|
| CN | 110831197 | A | 2/2020 |
| CN | 110856276 | A | 2/2020 |
| CN | 110958670 | A | 4/2020 |
| CN | 111132328 | A | 5/2020 |
| CN | 111294928 | A | 6/2020 |
| CN | 112262597 | A | 1/2021 |
| CN | 115484615 | A | 12/2022 |
| CN | 116472760 | | 7/2023 |
| WO | WO-2019097643 | A1 | 5/2019 |
| WO | WO-2019217717 | A1 | 11/2019 |
| WO | WO-2020092415 | A1 | 5/2020 |
| WO | WO-2022035762 | | 2/2022 |

OTHER PUBLICATIONS

International Search Report and Written Opinion—PCT/CN2020/107387—ISA/EPO—Apr. 29, 2021 (206898WO1).

Supplementary European Search Report—EP20948315—Search Authority—The Hague—Apr. 4, 2024 (206898EP).

ZTE Corporation, et al., "2-step RACH vs RACH-Less Handover", R2-1904247, 3rd Generation Partnership Project (3GPP), Mobile Competence Centre, 650, Route Des Lucioles, F-06921 Sophia-Antipolis Cedex, France, vol. RAN WG2, No. Xian, China, Apr. 8, 2019-Apr. 12, 2019, Apr. 6, 2019 (Apr. 6, 2019), XP051701555, 6 pages, p. 1-p. 6, p. 3, penultimate paragaph.

ZTE Corporation, et al., "Discussion on the RACH-less HO in NR", R2-1904246, 3rd Generation Partnership Project (3GPP), Mobile Competence Centre, 650, Route Des Lucioles, F-06921 Sophia-Antipolis Cedex, France, vol. RAN WG2, No. Xian, China, Apr. 8, 2019-Apr. 12, 2019, Apr. 6, 2019, XP051701554, 4 pages, p. 1-p. 4, p. 3, line 8-line 16.

CATT: "Discussion on Remaining Issues on Small Data Transmission", 3GPP TSG RAN WG1 #104b-e, R1-2102578, e-Meeting, Apr. 12-Apr. 20, 2021, 4 Pages.

Qualcomm Incorporated: "Latency Reduction Enhancements for SCG RACH Procedure", 3GPP TSG RAN WG2 Meeting #108, R2-1915865, Reno, Nevada, US, Nov. 18-22, 2019, Nov. 22, 2019, pp. 1-8.

Sony: "Configuration of CORESET and Search space for SDT", 3GPP TSG-RAN WG1 Meeting #104b, R1-2103286, Online, Apr. 12-20, 2021, 3 Pages.

ZTE Corporation, et al., "2-step RACH vs RACH-less Handover", 3GPP TSG RAN WG2 Meeting #105bis, R2-1904247, Xi'an, China, Apr. 8-12, 2019, Apr. 12, 2019, 6 Pages.

ZTE Corporation, et al., "Discussion on the RACH-less HO in NR", 3GPP TSG RAN WG2 Meeting #105bis, R2-1904246, Xi'an, China, Apr. 8-12, 2019, Apr. 12, 2019, 4 Pages.

ZTE, et al., "Discussion on the Physical Layer Aspects of Small Data Transmission", 3GPP TSG RAN WG1 #104-e, R1-2100080, Feb. 5, 2021 (Feb. 5, 2021), 7 Pages, Section 3.

ZTE, et al., "Discussion on the Physical Layer Aspects of Small Data Transmission", 3GPP TSG RAN WG1 #104b-e, R1-2103494 e-Meeting, Apr. 12-Apr. 20, 2021, pp. 1-4.

Qualcomm Incorporated: "Discussion on open issues for CG based SDT", R2-2105887, Revision of R2-2103434, 3rd Generation Partnership Project, Mobile Competence Centre, 650, Route Des Lucioles, F-06921 Sophia-antipolis Cedex, France, vol. RAN WG2, No. electronic, May 19, 2021-May 27, 2021, May 11, 2021, 5 Pages, XP052007348, the whole document.

Samsung: "Configured Grant based Small Data Transmission", R2-2009094, 3rd Generation Partnership Project, Mobile Competence Centre, 650, Route Des Lucioles, F-06921 Sophia-antipolis Cedex, France, vol. RAN WG2, No. Electronic, Nov. 2, 2020-Nov. 13, 2020, Oct. 23, 2020, XP052362146, 8 Pages, the whole document.

Taiwan Search Report—TW110129071—TIPO—May 12, 2025 (206898TW).

* cited by examiner

300

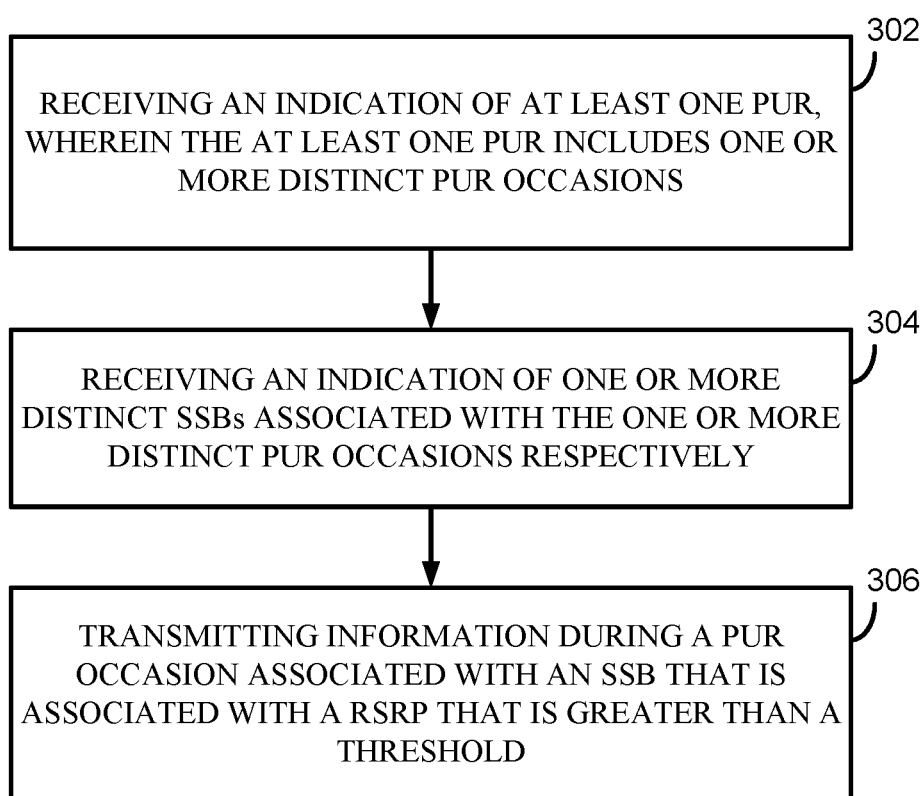

302

RECEIVING AN INDICATION OF AT LEAST ONE PUR, WHEREIN THE AT LEAST ONE PUR INCLUDES ONE OR MORE DISTINCT PUR OCCASIONS

304

RECEIVING AN INDICATION OF ONE OR MORE DISTINCT SSBs ASSOCIATED WITH THE ONE OR MORE DISTINCT PUR OCCASIONS RESPECTIVELY

306

TRANSMITTING INFORMATION DURING A PUR OCCASION ASSOCIATED WITH AN SSB THAT IS ASSOCIATED WITH A RSRP THAT IS GREATER THAN A THRESHOLD

*FIG. 3*

500

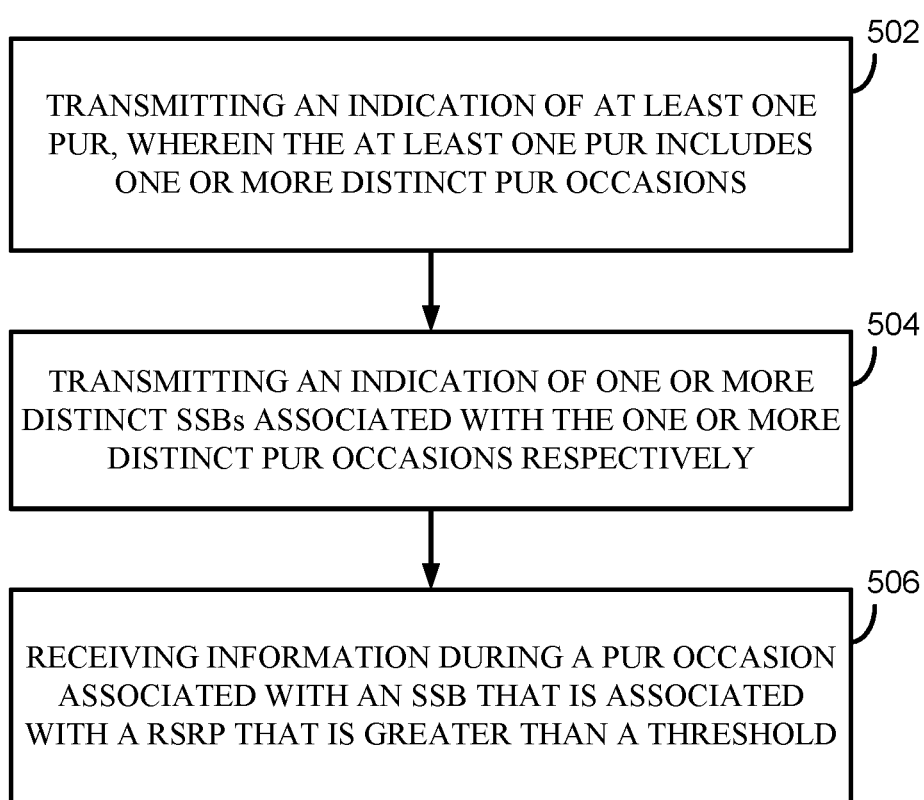

TRANSMITTING AN INDICATION OF AT LEAST ONE PUR, WHEREIN THE AT LEAST ONE PUR INCLUDES ONE OR MORE DISTINCT PUR OCCASIONS

502

TRANSMITTING AN INDICATION OF ONE OR MORE DISTINCT SSBs ASSOCIATED WITH THE ONE OR MORE DISTINCT PUR OCCASIONS RESPECTIVELY

504

RECEIVING INFORMATION DURING A PUR OCCASION ASSOCIATED WITH AN SSB THAT IS ASSOCIATED WITH A RSRP THAT IS GREATER THAN A THRESHOLD

MULTI-BEAM TECHNIQUES FOR SMALL DATA TRANSFER OVER PRECONFIGURED UPLINK RESOURCES

CROSS-REFERENCE TO RELATED APPLICATIONS

This application claims the benefit of International Patent Application No. PCT/CN2020/107387, entitled, "MULTI-BEAM TECHNIQUES FOR SMALL DATA TRANSFER OVER PRECONFIGURED UPLINK RESOURCES," filed on Aug. 6, 2020, which is expressly incorporated by reference herein in its entirety.

TECHNICAL FIELD

Aspects of the present disclosure relate generally to wireless communication systems, and more particularly, to multi-beam techniques for small data transfer over preconfigured uplink resources. Certain aspects of the technology discussed below can enable and provide enhanced communication features and techniques for communication systems, including lower power, lower latency, and lower memory usage.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method for wireless communication performed by a UE is provided. For example, a method can include receiving an indication of at least one preconfigured uplink resource (PUR) allocated for uplink communication when the UE does not have a radio resource control (RRC) connection with a base station, wherein the at least one PUR includes one or more distinct PUR occasions. The method can further include receiving an indication of one or more distinct synchronization signal blocks (SSBs) associated with the one or more distinct PUR occasions, wherein each PUR occasion of the one or more distinct PUR occasions is associated with only one SSB of the one or more distinct SSBs. The method can also include transmitting information during a PUR occasion associated with an SSB that is associated with a reference signal received power (RSRP) that is greater than a threshold.

In another aspect of the disclosure, a UE configured for wireless communication is provided. For example, the UE can include means for receiving an indication of at least one PUR allocated for uplink communication when the UE does not have a RRC connection with a base station, wherein the at least one PUR includes one or more distinct PUR occasions. The UE can also include means for receiving an indication of one or more distinct SSBs associated with the one or more distinct PUR occasions, wherein each PUR occasion of the one or more distinct PUR occasions is associated with only one SSB of the one or more distinct SSBs. The UE can further include means for transmitting information during a PUR occasion associated with an SSB that is associated with a RSRP that is greater than a threshold.

In an additional aspect of the disclosure, a non-transitory computer-readable medium having program code recorded thereon is provided. The program code can include program code executable by a computer for causing the computer to receive an indication of at least one PUR allocated for uplink communication when a UE does not have a RRC connection with a base station, wherein the at least one PUR includes one or more distinct PUR occasions. The program code can also include program code executable by the computer for causing the computer to receive an indication of one or more distinct SSBs associated with the one or more distinct PUR occasions, wherein each PUR occasion of the one or more distinct PUR occasions is associated with only one SSB of the one or more distinct SSBs. The program code can further include program code executable by the computer for causing the computer to transmit information during a PUR occasion associated with an SSB that is associated with a RSRP that is greater than a threshold.

In another aspect of the disclosure, a UE is provided. The UE may include at least one processor. The UE may also include at least one memory communicatively coupled with the at least one processor and storing processor-readable code that, when executed by the at least one processor in conjunction with at least one modem, is configured to receive an indication of at least one PUR allocated for uplink communication when the UE does not have a RRC connection with a base station, wherein the at least one PUR includes one or more distinct PUR occasions. The at least one memory may further store processor-readable code that, when executed by the at least one processor in conjunction with at least one modem, is configured to receive an indication of one or more distinct SSBs associated with the one or more distinct PUR occasions, wherein each PUR occasion of the one or more distinct PUR occasions is associated with only one SSB of the one or more distinct SSBs. The at least one memory may further store processor-readable code that, when executed by the at least one processor in conjunction with at least one modem, is configured to transmit information during a PUR occasion associated with an SSB that is associated with a RSRP that is greater than a threshold.

In one aspect of the disclosure, a method for wireless communication performed by a base station is provided. For example, a method can include transmitting an indication of at least one PUR allocated for uplink communication when a UE does not have a RRC connection with the base station, wherein the at least one PUR includes one or more distinct PUR occasions. The method can also include transmitting an indication of one or more distinct SSBs associated with the one or more distinct PUR occasions, wherein each PUR occasion of the one or more distinct PUR occasions is associated with only one SSB of the one or more distinct SSBs. The method can further include receiving information during a PUR occasion associated with an SSB that is associated with a RSRP that is greater than a threshold.

In another aspect of the disclosure, a base station configured for wireless communication is provided. For example, the base station can include means for transmitting an indication of at least one PUR allocated for uplink communication when a UE does not have a RRC connection with the base station, wherein the at least one PUR includes one or more distinct PUR occasions. The base station can also include means for transmitting an indication of one or more distinct SSBs associated with the one or more distinct PUR occasions, wherein each PUR occasion of the one or more distinct PUR occasions is associated with only one SSB of the one or more distinct SSBs. The base station can further include means for receiving information during a PUR occasion associated with an SSB that is associated with a RSRP that is greater than a threshold.

In an additional aspect of the disclosure, a non-transitory computer-readable medium having program code recorded thereon is provided. The program code can include program code executable by a computer for causing the computer to transmit an indication of at least one PUR allocated for uplink communication when a UE does not have a RRC connection with the base station, wherein the at least one PUR includes one or more distinct PUR occasions. The program code can also include program code executable by the computer for causing the computer to transmit an indication of one or more distinct SSBs associated with the one or more distinct PUR occasions, wherein each PUR occasion of the one or more distinct PUR occasions is associated with only one SSB of the one or more distinct SSBs. The program code can also include program code executable by the computer for causing the computer to receive information during a PUR occasion associated with an SSB that is associated with a RSRP that is greater than a threshold.

In another aspect of the disclosure, a base station is provided. The base station may include at least one processor. The base station may also include at least one memory communicatively coupled with the at least one processor and storing processor-readable code that, when executed by the at least one processor in conjunction with at least one modem, is configured to transmit an indication of at least one PUR allocated for uplink communication when a UE does not have a RRC connection with the base station, wherein the at least one PUR includes one or more distinct PUR occasions. The at least one memory may further store processor-readable code that, when executed by the at least one processor in conjunction with at least one modem, is configured to transmit an indication of one or more distinct SSBs associated with the one or more distinct PUR occasions, wherein each PUR occasion of the one or more distinct PUR occasions is associated with only one SSB of the one or more distinct SSBs. The at least one memory may further store processor-readable code that, when executed by the at least one processor in conjunction with at least one modem, is configured to receive information during a PUR occasion associated with an SSB that is associated with a RSRP that is greater than a threshold.

Other aspects, features, and embodiments will become apparent to those of ordinary skill in the art, upon reviewing the following description of specific, exemplary embodiments in conjunction with the accompanying figures. While features may be discussed relative to certain aspects and figures below, all embodiments can include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label with a second label that distinguishes among the similar components. If just the first reference label is used in the specification, the description is applicable to any one of the similar components having the same first reference label irrespective of the second reference label.

FIG. 3 is a block diagram illustrating a method for multi-beam support for small data transfer over preconfigured uplink resources according to some aspects of the present disclosure.

FIG. 5 is another block diagram illustrating another method for multi-beam support for small data transfer over preconfigured uplink resources according to some aspects of the present disclosure.

DETAILED DESCRIPTION

Figure 1:
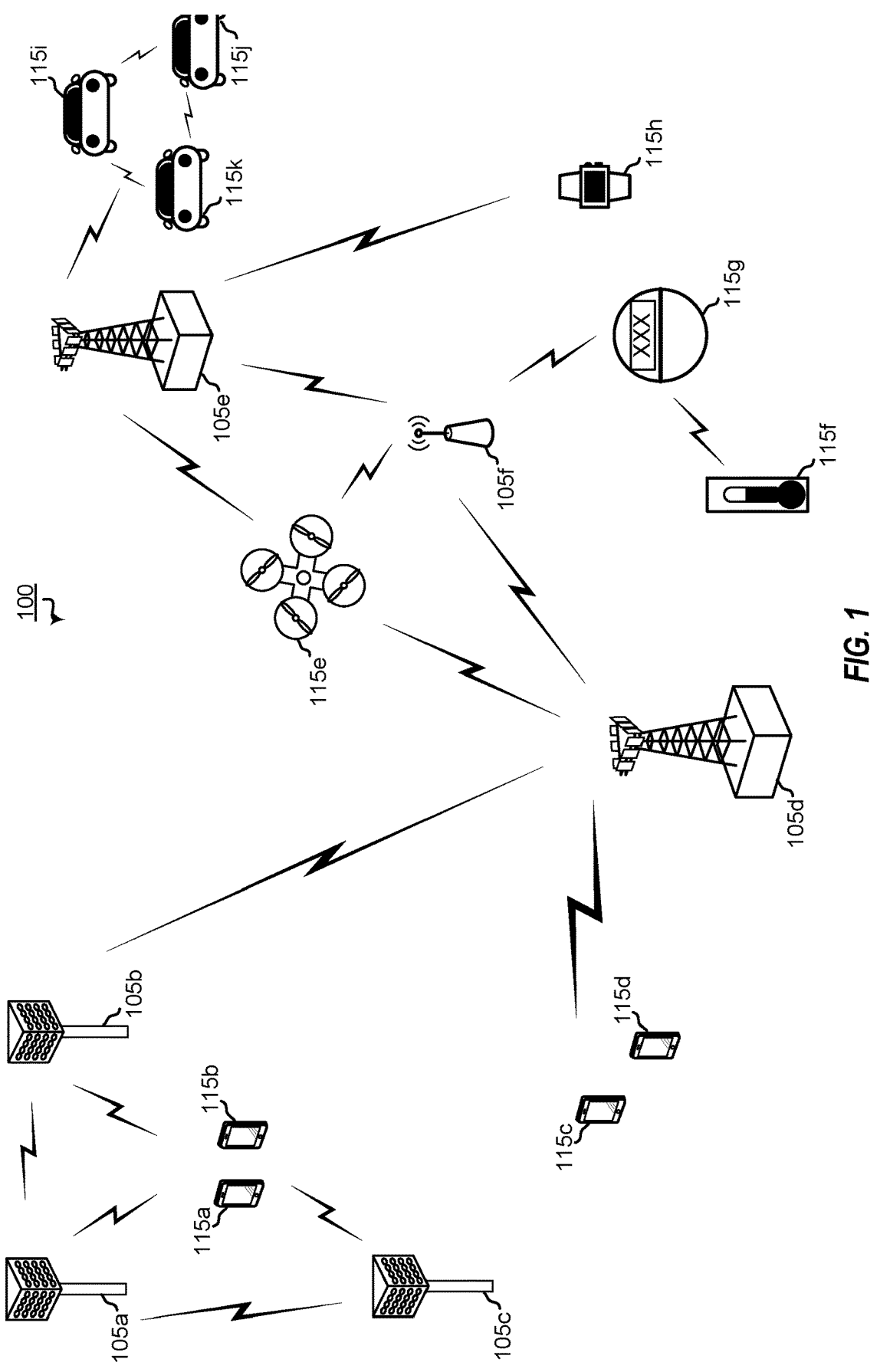
FIG. 1 is a block diagram illustrating details of a wireless communication system according to some aspects of the present disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The Third Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. Additionally, an operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects descried with reference to one technology may be understood to be applicable to another technology. Indeed, one or more aspects of the present disclosure are related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHZ, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 is a block diagram illustrating details of an example wireless communication system. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component device/module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink and/or uplink, or desired transmission between base stations, and backhaul transmissions between base stations. UEs may operate as base stations or other network nodes in some scenarios. Backhaul communication between base stations of wireless network 100 may occur using wired and/or wireless communication links.

In operation at wireless network 100, base stations 105a-105c serve UEs 115a and 115b using 3D beamforming and coordinated spatial techniques, such as coordinated multipoint (COMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD/FDD communications, such as in a vehicle-to-vehicle (V2V) mesh network between UEs 115i-115k communicating with macro base station 105e.

Figure 2:
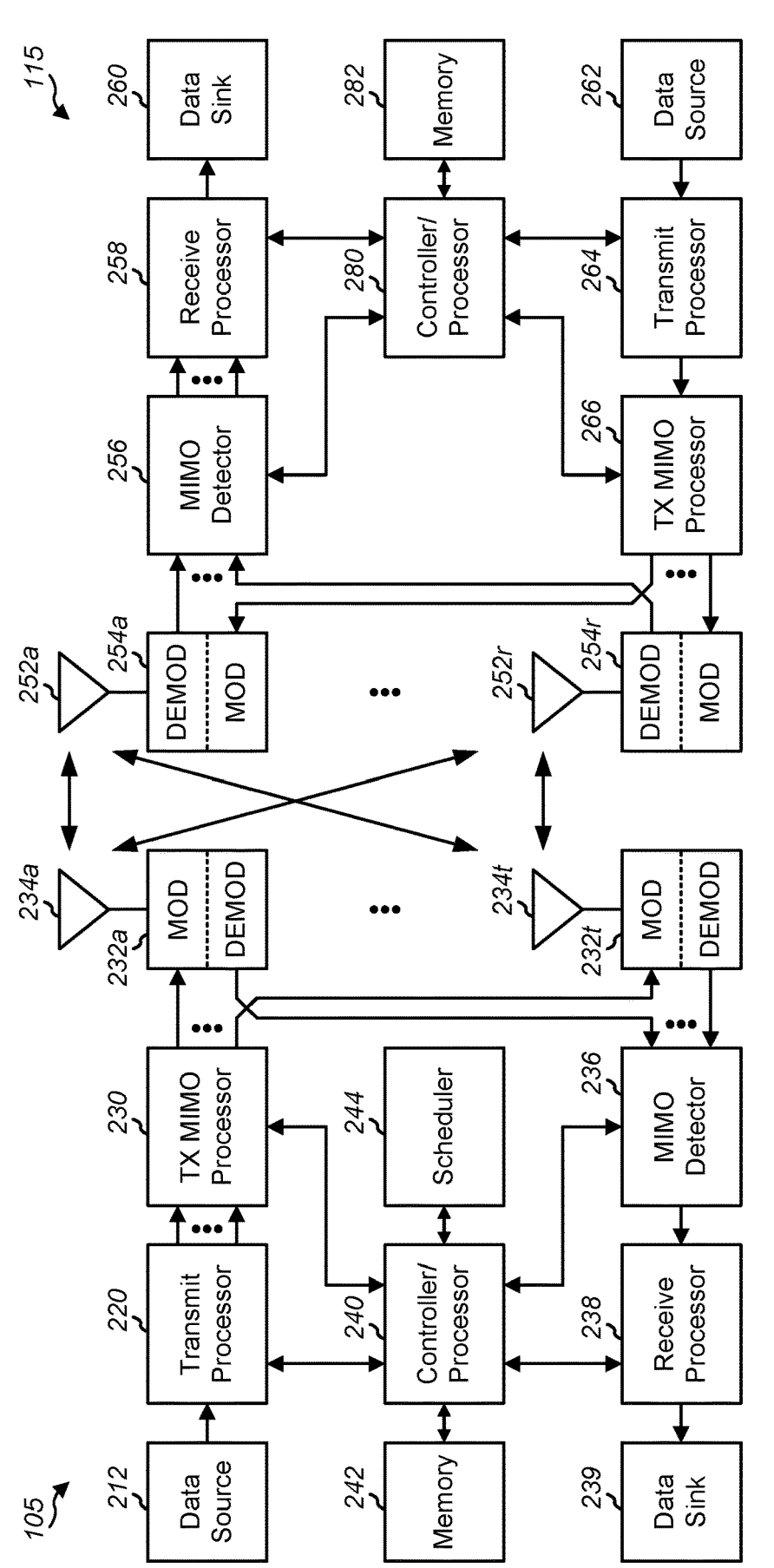
FIG. 2 is a block diagram conceptually illustrating a design of a base station and a UE configured according to some aspects of the present disclosure.

FIG. 2 shows a block diagram conceptually illustrating an example design of a base station 105 and a UE 115, which may be any of the base stations and one of the UEs in FIG. 1. For a restricted association scenario (as mentioned above), base station 105 may be small cell base station 105f in FIG. 1, and UE 115 may be UE 115c or 115D operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, the antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller/processor 280.

On the uplink, at UE 115, transmit processor 264 may receive and process data (e.g., for the physical uplink shared channel (PUSCH)) from data source 262 and control information (e.g., for the physical uplink control channel (PUCCH)) from controller/processor 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 280 and/or other processors and modules at UE 115 may perform or direct the execution of various processes for the techniques described herein, such as to perform or direct the execution illustrated in FIGS. 3 and 5, and/or other processes for the techniques described herein. Memories 242 and 282 may store data and program codes for base station 105 and UE 115, respectively. Scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

In some aspects of the disclosure, a UE, such as UE 115, and a base station, such as base station/gNB 105, may perform small data transfer (SDT) operations while the UE is in a radio resource control (RRC) idle/inactive state. For example, in some aspects, when a UE has only a small amount of data to send, the UE may transmit its data over preconfigured uplink resources (PURs) without going through the typical data transfer operations, which may include random access channel (RACH) operations, RRC connection setup operations, data transfer, and RRC connection release operations. In general, PURs may be allocated to a UE before the UE needs to transmit data so that when the UE does need to transmit a small amount of data, the UE can do so using the PURs without first needing to setup an RRC connection.

Conventional SDT over PURs do not support multi-beam operations. This may yield unfavorable operations in some instances and/or less-than-optimal performance associated with SDT over PURs.

Aspects of this disclosure may provide enhanced techniques for performing SDT over PURs, such as multi-beam techniques for SDT over PURs to support multi-beam operations. FIG. 3, as an example, shows a block diagram illustrating a method for multi-beam support for SDT over PURs according to some aspects of the present disclosure.

Aspects of method 300 may be implemented with various other aspects of this disclosure described with respect to FIGS. 1-2, 4, and 6, such as a mobile device/UE. For example, with reference to FIG. 2, controller/processor 280 of UE 115 may control UE 115 to perform method 300.

Figure 6:
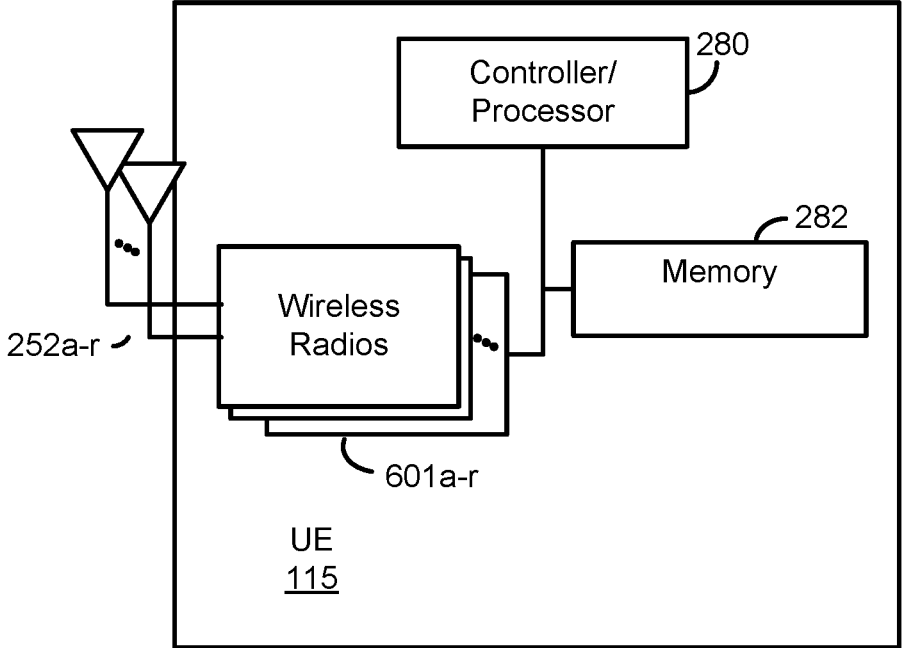
FIG. 6 is a block diagram conceptually illustrating a design of a UE configured according to some aspects of the present disclosure.

The example blocks of method 300 will also be described with respect to UE 115 as illustrated in FIG. 6. FIG. 6 is a block diagram conceptually illustrating a design of a UE configured according to some aspects of the present disclosure. UE 115 may include various structures, hardware, and components, such as those illustrated for UE 115 of FIG. 2. For example, UE 115 includes controller/processor 280, which operates to execute logic or computer instructions stored in memory 282. The controller/processor 280 can also control components of UE 115 that provide the features and functionality of UE 115. UE 115, under control of controller/processor 280, transmits and receives signals via wireless radios 601a-r and antennas 252a-r. Wireless radios 601a-r include various components and hardware, as illustrated in FIG. 2 for UE 115, including modulator/demodulators 254a-r, MIMO detector 256, receive processor 258, transmit processor 264, and TX MIMO processor 266. The controller/processor 280 can be provided with digital signals obtained from sampling received analog wireless signals for purposes of controlling communication operations.

FIG. 3 illustrates a method 300 that may be performed by a wireless communication device, such as a UE 115. Method 300 includes, at block 302, a UE receiving an indication of at least one PUR allocated for UE uplink communication when the UE may not have a RRC connection with a base station. Similarly, as described below with respect to FIG. 5, a base station, such as a gNB 105, may transmit an indication of at least one PUR allocated for UE uplink communication when the UE may not have a RRC connection with the base station. In some aspects, the at least one PUR may include one or more distinct PUR occasions. At block 304, method 300 includes the UE receiving an indication of one or more distinct synchronization signal blocks (SSBs) associated with the one or more distinct PUR occasions. Similarly, as described below with respect to FIG. 5, a base station may transmit an indication of one or more distinct SSBs associated with the one or more distinct PUR occasions. In some aspects, each PUR occasion of the one or more distinct PUR occasions may be associated with only one SSB of the one or more distinct SSBs. Method 300 also includes, at block 306, the UE transmitting information to the base station during a PUR occasion associated with an SSB that is associated with a reference signal received power (RSRP) that is greater than a threshold. Similarly, as described below with respect to FIG. 5, a base station, such as a gNB 105, may receive information during a PUR occasion associated with an SSB that is associated with a RSRP that is greater than a threshold. The actions shown at blocks 302 through 306 of method 300, as well as the actions shown at blocks 502 through 506 of method 500 (described below), may be a subset of the overall operations performed by a UE and/or base station to provide multi-beam support for SDT over PURs. The relationship between the actions shown at blocks 302 through 306 of method 300, the actions shown at blocks 502 through 506 of method 500, and other operations that are performed by a UE and/or base station to provide multi-beam support for SDT over PURs may become more evident from a discussion of the overall operations performed by a UE and/or base station to provide multi-beam support for SDT over PURs.

Figure 4:
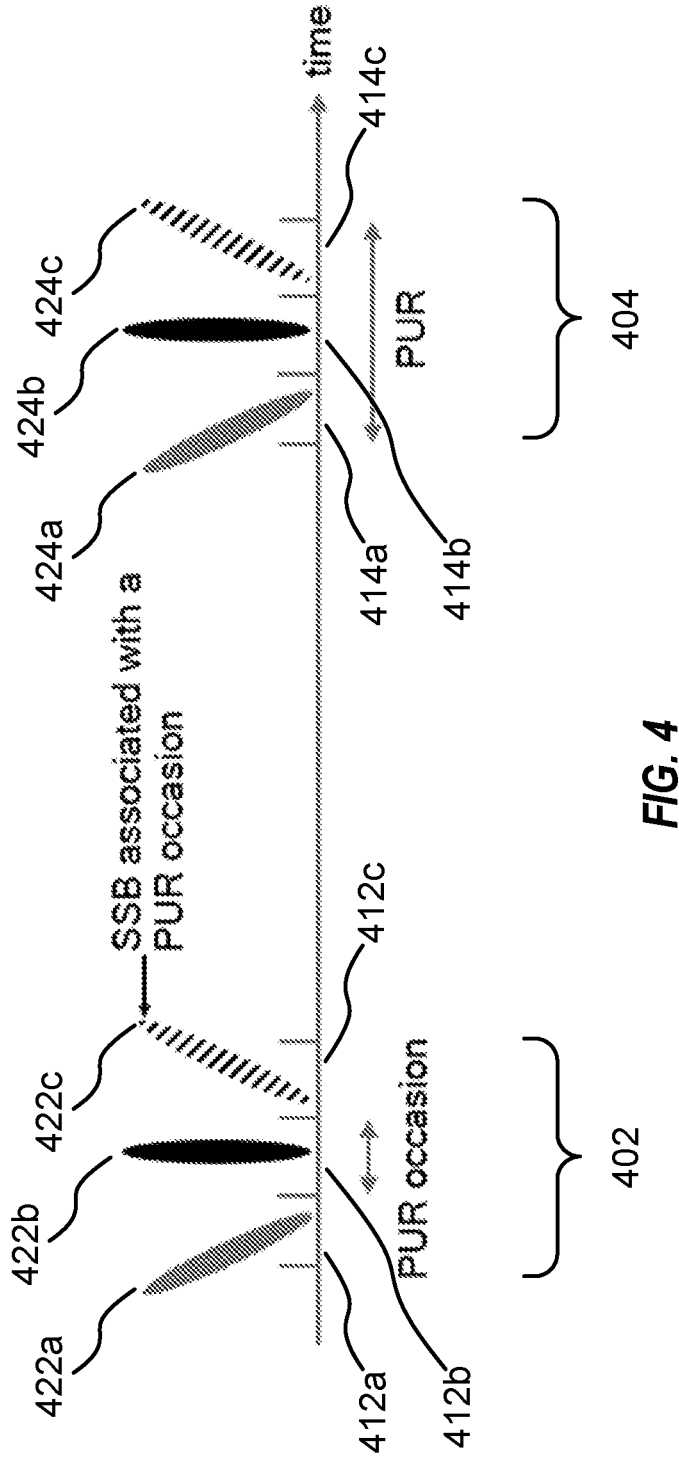
FIG. 4 is a diagram illustrating an example association between preconfigured uplink resources and synchronization signal blocks to provide multi-beam support for small data transfer over preconfigured uplink resources according to some aspects of the present disclosure.

FIG. 4, as an example, shows a diagram illustrating an example association between PURs and SSBs to provide multi-beam support for SDT over PURs according to some aspects of the present disclosure. FIG. 4 shows a first PUR 402 and a second PUR 404. According to some aspects, a PUR, such as PUR 402, may refer to uplink resources that are preconfigured, e.g., allocated, to a UE before the UE has information to transmit. For example, PURs may be allocated to a UE without the UE first requesting uplink resources to communicate information on an uplink. In other words, PURs may be uplink resources that a UE may use in the future when the UE needs to transmit information on an uplink. In some aspects, a PUR may reduce overhead associated with uplink communication. For example, a UE may use a PUR to transmit small amounts of data to a base station without first needing to setup an RRC connection with the base station. In other words, an RRC connection between a UE and a base station may not be needed for the UE to use a PUR to transmit information to the base station. Therefore, the UE may use the PUR to transmit information while the UE remains in an RRC idle/inactive state. In some aspects, a PUR, such as PUR 402 or PUR 404, may be associated with specific frequency and/or time resources.

According to some aspects, each PUR, such as PUR 402 or PUR 404, may include one or more distinct PUR occasions. For example, in FIG. 4, PUR 402 includes PUR occasions 412a, 412b, and 412c. Similarly, PUR 404 includes PUR occasions 414a, 414b, and 414c. In some aspects, the PUR occasions of a PUR may be associated with the same frequency resources. Frequency resources may refer to one or more subcarriers, or groups of one or more subcarriers, such as resource blocks. According to some aspects, each PUR occasion of a PUR may be associated with different time resources. Time resources may refer to one or more symbols, or groups of one or more symbols, such as slots, subframes, or frames. For example, each of PUR occasions 412a, 412b, and 412c may be associated with different time resources, e.g., one or more symbols, associated with PUR 402.

As illustrated in FIG. 4, each PUR occasion of a PUR may be associated with a different SSB. For example, in FIG. 4, PUR occasion 412a is associated with SSB 422a, PUR occasion 412b is associated with SSB 422b, and PUR occasion 412c is associated with SSB 422c. Similarly, PUR occasion 414a is associated with SSB 424a, PUR occasion 414b is associated with SSB 424b, and PUR occasion 414c is associated with SSB 424c.

In some aspects, a UE may receive an indication of at least one PUR, as shown at block 302 of FIG. 3. Similarly, a base station may transmit an indication of at least one PUR, as shown at block 502 of FIG. 5. The at least one PUR may be allocated for UE uplink communication so that the UE may use the PUR for uplink communication when the UE does not have a RRC connection with a base station, e.g., when the UE is in an RRC idle/inactive state. As illustrated in FIG. 4, and as shown at block 302 of FIG. 3 and block 502 of FIG. 5, the at least one PUR, such as PUR 402, may include one or more distinct PUR occasions, such as PUR occasions 412a, 412b, and 412c.

According to some aspects, a UE may also receive an indication of one or more distinct SSBs associated with the one or more distinct PUR occasions, as shown at block 304 of FIG. 3. Similarly, a base station may transmit an indication of one or more distinct SSBs associated with the one or more distinct PUR occasions, as shown at block 504 of FIG. 5. In some aspects, the indication of one or more distinct SSBs associated with the one or more distinct PUR occasions may include a list of SSBs and a mapping between SSBs and PUR occasions for each PUR so that a UE may know which SSBs are associated with each PUR occasion. For example, with reference to FIG. 4, the indication of one or more distinct SSBs associated with the one or more distinct PUR occasions may indicate that SSBs 422a, 422b, and 422c are associated with PUR occasions 412a, 412b, and 412c, respectively. As illustrated in FIG. 4, each PUR occasion of the one or more distinct PUR occasions may be associated with only one SSB of the one or more distinct SSBs.

In some aspects, a UE may process the indicated one or more distinct SSBs to determine which PUR occasion to use for uplink communication. For example, in some aspects, a UE may measure RSRP associated with each SSB of the one or more distinct SSBs. According to some aspects, each SSB of the one or more distinct SSBs may be associated with only one RSRP. In some aspects, the UE may identify at least one SSB whose associated RSRP is greater than, or equal to, a threshold. As one example with reference to FIG. 4, the UE may determine that the RSRP associated with SSB 422b and the RSRP associated with SSB 422c are both greater than, or equal to, the threshold. According to some aspects, the UE may select an SSB from the identified at least one SSB whose associated RSRP is greater than, or equal to, the threshold. In some aspects, the selected SSB may serve as the basis for UE uplink communication. For example, as described in more detail below, the UE may transmit information to the base station during a PUR occasion associated with the selected SSB. As an illustration with respect to FIG. 4, the UE may select SSB 422b, e.g., to serve as the basis for UE uplink communication. According to some aspects, the selection by the UE of an SSB from the identified at least one SSB whose associated RSRP is greater than, or equal to, the threshold may be based on various factors. For example, in one aspect, the UE may select the SSB with the strongest RSRP.

In some aspects, a UE may receive from a base station, and a base station may transmit to a UE, a value for the threshold to be used by the UE when evaluating the RSRPs associated with each SSB of the one or more distinct SSBs. In additional aspects, the UE may know the value for the threshold based on information provided in a wireless communication standard or specification. For example, in some aspects, the information from the wireless communication standard or specification may be programmed into the UE so that the UE may know the value for the threshold.

In some aspects, a UE may transmit information during a PUR occasion associated with an SSB that is associated with a RSRP that is greater than, or equal to, the threshold, as shown at block 306 of FIG. 3. Similarly, a base station may receive information during a PUR occasion associated with an SSB that is associated with a RSRP that is greater than, or equal to, the threshold, as shown at block 506 of FIG. 5. For example, the SSB that is associated with an RSRP that is greater than, or equal to, the threshold may be the SSB selected from the identified at least one SSB whose associated RSRP is greater than, or equal to, the threshold. Then the PUR occasion during which the information is transmitted from the UE to the base station may be the PUR occasion associated with the selected SSB. As an illustration with respect to FIG. 4, the UE may transmit information to the base station during PUR occasion 412b when the UE selects SSB 422b from the identified at least one SSB whose associated RSRP is greater than, or equal to, the threshold.

According to some aspects, the UE may transmit the information during the PUR occasion using a transmission beam that has a beam correspondence with a beam associated with the SSB that is associated with the PUR occasion during which the information is transmitted. For example, in one aspect, the UE may transmit the information using a transmission beam that is a reciprocal, or a near reciprocal, of the reception beam used by the UE to receive the selected SSB. In another aspect, the UE may transmit the information using a transmission beam that points in the direction, or close to the direction, of the beam used by the base station to transmit the selected SSB.

In some aspects, the UE may transmit the information during the PUR occasion while the UE does not have the RRC connection with the base station, e.g., while the UE is in an RRC idle/inactive state. Similarly, the base station may receive the information during the PUR occasion while the UE does not have the RRC connection with the base station.

In some aspects, a UE may receive an indication of a search space associated with a control resource set (CORESET) that the UE may monitor for a response from the base station. Similarly, a base station may transmit an indication of the search space associated with the CORESET that the UE may monitor for a response from the base station. According to some aspects, the response may be responsive to the information transmitted by the UE during the PUR occasion associated with the SSB that is associated with the RSRP that is greater than, or equal to, the threshold. For example, in some aspects, the response may refer to downlink control information (DCI), e.g., DCI provided in a PDCCH. In some aspects, the search space may be defined based on CORESET 0. For example, the base station may inform the UE that the base station will sweep all beams to transmit the response, e.g., the DCI in the PDCCH, in CORESET 0. In some aspects, after receiving the information from the UE during the PUR occasion selected by the UE, the base station may transmit the response in the indicated search space associated with the CORESET, e.g., CORESET 0.

According to some aspects, after transmitting the information during the selected PUR occasion, the UE may monitor the indicated search space associated with the CORESET for the response from the base station. For example, the UE may monitor the PDCCH in the indicated search space over monitoring occasions that are quasi-co-located (QCLed) with their associated SSBs. In some aspects, the UE may select a reception beam to use to monitor the indicated search space based on various factors. For example, according to some aspects, the UE may monitor the indicated search space using a reception beam that has a beam correspondence with the transmission beam used to transmit the information during the selected PUR occasion. As an example, in one aspect, the UE may monitor the indicated search space using a reception beam that is a reciprocal, or a near reciprocal, of the transmission beam used by the UE to transmit the information during the PUR occasion associated with the SSB that is associated with the RSRP that is greater than, or equal to, the threshold.

In some aspects, the UE may start at least one timer associated with the monitoring of the indicated search space. According to some aspects, the at least one timer may include a retransmission timer and/or a round-trip time (RTT) timer. When the UE uses both the RTT timer and the retransmission timer, the UE may start the RTT timer first. For example, the UE may start the RTT timer after transmitting the information during the PUR occasion associated with the SSB that is associated with the RSRP that is greater than, or equal to, the threshold. In some aspects, the UE may not monitor the PDCCH in the indicated search space while the RTT timer is running. When the RTT timer expires, the UE may start the retransmission timer and may also start monitoring the indicated search space for the response from the base station. When the UE does not use the RTT timer, e.g., the UE uses only the retransmission timer, the UE may start the retransmission timer after transmitting the information during the PUR occasion associated with the SSB that is associated with the RSRP that is greater than, or equal to, the threshold. In some aspects, the UE may monitor the indicated search space while the retransmission timer is running.

In some aspects, a UE may receive from a base station, and a base station may transmit to a UE, values for the retransmission timer and/or the RTT timer to be used by the UE. In additional aspects, the UE may know the values for the timers based on information provided in a wireless communication standard or specification. For example, in some aspects, the information from the wireless communication standard or specification may be programmed into the UE so that the UE may know the values for the timers.

According to some aspects, the UE may initiate a random access channel (RACH) operation to transmit the information to the base station when the at least one timer, e.g., the retransmission timer and/or the RTT timer, has expired and the UE has not received the response while monitoring the indicated search space for the response. For example, if the UE does not receive any DCI in the indicated search space upon expiry of the at least on timer, the UE may switch to a RACH-based SDT process. In additional aspects, upon expiry of the at least one timer, the UE may follow a traditional dynamic grant/assignment procedure per scheduling by the base station to transmit the information.

In some aspects, one or more of the indications disclosed herein as being received by the UE may be included in a single configuration message received by the UE from the base station. Similarly, one or more of the indications disclosed herein as being transmitted by the base station may be included in a single configuration message transmitted by the base station to the UE. For example, in some aspects, the UE may receive from the base station, and the base station may transmit to the UE, at least one of the indication of the at least one PUR, the indication of the one or more distinct SSBs, or the indication of the search space in a configuration message, such as an RRC Release message.

FIG. 5, as an example, shows another method for multi-beam support for SDT over PURs according to some aspects of the present disclosure. Aspects of method 500 may be implemented with various other aspects of this disclosure described with respect to FIGS. 1-2, 4, and 7, such as a base station/gNB. For example, with reference to FIG. 2, controller/processor 240 of base station 105 may control base station 105 to perform method 500.

Figure 7:
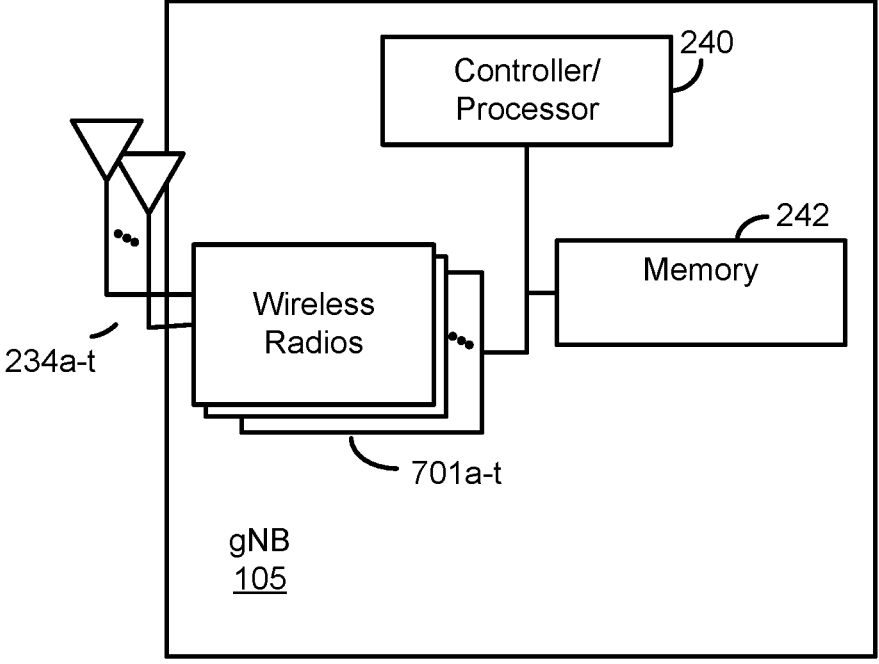
FIG. 7 is a block diagram conceptually illustrating a design of a base station (e.g., a gNB) configured according to some aspects of the present disclosure.

The example blocks of method 500 will also be described with respect to base station 105 as illustrated in FIG. 7. FIG. 7 is a block diagram conceptually illustrating a design of a base station (e.g., a gNB) configured according to some aspects of the present disclosure. Base station 105 may include various structures, hardware, and components, such as those illustrated for base station 105 of FIG. 2. For example, base station 105 includes controller/processor 240, which operates to execute logic or computer instructions stored in memory 242. The controller/processor 240 can also control components of base station 105 that provide the features and functionality of base station 105. Base station 105, under control of controller/processor 240, transmits and receives signals via wireless radios 701a-t and antennas 234a-t. Wireless radios 701a-t include various components and hardware, as illustrated in FIG. 2 for base station 105, including modulator/demodulators 232a-t, MIMO detector 236, receive processor 238, transmit processor 220, and TX MIMO processor 230. The controller/processor 240 can be provided with digital signals obtained from sampling received analog wireless signals for purposes of controlling communication operations.

FIG. 5 illustrates a method 500 that may be performed by a wireless communication device, such as a gNB 105. Method 500 includes, at block 502, a base station transmitting an indication of at least one PUR allocated for uplink communication when a UE does not have a RRC connection with the base station. In some aspects, the at least one PUR may include one or more distinct PUR occasions. Method 500 also includes, at block 504, the base station transmitting an indication of one or more distinct SSBs associated with the one or more distinct PUR occasions. In some aspects, each PUR occasion of the one or more distinct PUR occasions may be associated with only one SSB of the one or more distinct SSBs. Method 500 also includes, at block 506, the base station receiving information during a PUR occasion associated with an SSB that is associated with a RSRP that is greater than a threshold.

In some aspects, multi-beam techniques for SDT over PURs may include a UE receiving from a base station an indication of at least one PUR allocated for uplink communication when the UE does not have a RRC connection with a base station. In some aspects, the at least one PUR may include one or more distinct PUR occasions. Multi-beam techniques for SDT over PURs may also include a UE receiving an indication of one or more distinct SSBs associated with the one or more distinct PUR occasions. In some aspects, each PUR occasion of the one or more distinct PUR occasions may be associated with only one SSB of the one or more distinct SSBs. Multi-beam techniques for SDT over PURs may further include a UE transmitting information during a PUR occasion associated with an SSB that is associated with a RSRP that is greater than a threshold.

Multi-beam techniques for SDT over PURs may include additional aspects, such as any single aspect or any combination of aspects described below and/or in connection with one or more other processes described elsewhere herein.

In a first aspect, the UE may measure RSRP associated with each SSB of the one or more distinct SSBs. Each SSB of the one or more distinct SSBs may be associated with only one RSRP.

In a second aspect, alone or in combination with the first aspect, the UE may identify at least one SSB whose associated RSRP is greater than the threshold.

In a third aspect, alone or in combination with one or more of the first and second aspects, the UE may select the SSB associated with the PUR occasion during which the information is transmitted from the identified at least one SSB.

In a fourth aspect, alone or in combination with one or more of the first through third aspects, the UE may transmit the information during the PUR occasion using a transmission beam that has a beam correspondence with a beam associated with the SSB.

In a fifth aspect, alone or in combination with one or more of the first through fourth aspects, the UE may receive an indication of a search space associated with a control resource set that the UE is to monitor for a response from the base station.

In a sixth aspect, alone or in combination with one or more of the first through fifth aspects, the UE may monitor, after transmitting the information during the PUR occasion, the indicated search space associated with the control resource set for the response from the base station, wherein the response is responsive to the transmitted information.

In a seventh aspect, alone or in combination with one or more of the first through sixth aspects, the UE may receive at least one of the indication of the at least one PUR, the indication of the one or more distinct SSBs, or the indication of the search space in a configuration message.

In an eighth aspect, alone or in combination with one or more of the first through seventh aspects, the UE may start at least one timer associated with the monitoring of the indicated search space.

In a ninth aspect, alone or in combination with one or more of the first through eighth aspects, the UE may initiate a random access channel operation to transmit the information when the at least one timer has expired and the UE has not received the response while monitoring the indicated search space for the response.

In a tenth aspect, alone or in combination with one or more of the first through ninth aspects, the UE may transmit the information during the PUR occasion while the UE does not have the RRC connection with the base station.

In some aspects, multi-beam techniques for SDT over PURs may include a base station transmitting an indication of at least one PUR allocated for uplink communication when a UE does not have a RRC connection with the base station. In some aspects, the at least one PUR may include one or more distinct PUR occasions. Multi-beam techniques for SDT over PURs may also include a base station transmitting an indication of one or more distinct SSBs associated with the one or more distinct PUR occasions. In some aspects, each PUR occasion of the one or more distinct PUR occasions may be associated with only one SSB of the one or more distinct SSBs. Multi-beam techniques for SDT over PURs may further include a base station receiving information during a PUR occasion associated with an SSB that is associated with a RSRP that is greater than a threshold.

In an eleventh aspect, alone or in combination with one or more of the first through tenth aspects, a base station may transmit an indication of a search space associated with a control resource set that the UE is to monitor for a response from the base station.

In a twelfth aspect, alone or in combination with one or more of the first through eleventh aspects, a base station may transmit, after receiving the information during the PUR occasion, the response in the indicated search space associated with the control resource set.

In a thirteenth aspect, alone or in combination with one or more of the first through twelfth aspects, a base station may transmit at least one of the indication of the at least one PUR, the indication of the one or more distinct SSBs, or the indication of the search space in a configuration message.

In a fourteenth aspect, alone or in combination with one or more of the first through thirteenth aspects, a base station may receive the information during the PUR occasion while the UE does not have the RRC connection with the base station.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and modules described herein (e.g., the components, functional blocks, and modules in FIG. 2) may comprise processors, electronics devices, hardware devices, electronics components, logical circuits, memories, software codes, firmware codes, etc., or any combination thereof. In addition, features discussed herein may be implemented via specialized processor circuitry, via executable instructions, and/or combinations thereof.

Those of skill would further appreciate that the various illustrative logical blocks, modules, circuits, and algorithm steps (e.g., the logical blocks in FIGS. 3 and 5) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication performed by a user equipment (UE), comprising:
receiving an indication of at least one preconfigured uplink resource (PUR) allocated for uplink communication when the UE does not have a radio resource control (RRC) connection with a network entity, wherein the at least one PUR includes one or more distinct PUR occasions, wherein each of the one or more distinct PUR occasions is associated with different time resources;
receiving an indication of one or more different synchronization signal blocks (SSBs) respectively associated with the one or more distinct PUR occasions; and
transmitting information during a first PUR occasion, of the one or more distinct PUR occasions, that is associated with a first SSB, of the one or more different SSBs, that is associated with a reference signal received power (RSRP) that is greater than a threshold.

2. The method of claim 1, further comprising:
measuring a respective RSRP associated with each SSB of the one or more different SSBs; and selecting, associated with the first SSB having the associated RSRP greater than the threshold, the first SSB from the one or more different SSBs.

3. The method of claim 1, wherein the information transmitted during the first PUR occasion is transmitted using a transmission beam that has a beam correspondence with a beam associated with the first SSB.

4. The method of claim 1, further comprising:
receiving an indication of a search space associated with a control resource set that the UE is to monitor for a response from the network entity; and
monitoring, after transmitting the information during the first PUR occasion, the search space associated with the control resource set for the response from the network entity, wherein the response is associated with the information transmitted during the first PUR occasion.

5. The method of claim 1, further comprising receiving, in a configuration message, at least one of the indication of the at least one PUR, the indication of the one or more different SSBs, or an indication of a search space associated with a control resource set that the UE is to monitor for a response from the network entity.

6. The method of claim 4, further comprising:
starting at least one timer associated with the monitoring of the search space; and
initiating, associated with the UE not receiving the response prior to expiration of the at least one timer, a random access channel operation to transmit the information.

7. The method of claim 1, wherein the information transmitted during the first PUR occasion is transmitted while the UE does not have the RRC connection with the network entity.

8. A user equipment (UE), comprising:
at least one processor; and
at least one memory communicatively coupled with the at least one processor and storing processor-readable code that, when executed by the at least one processor in conjunction with at least one modem, is configured to:
receive an indication of at least one preconfigured uplink resource (PUR) allocated for uplink communication when the UE does not have a radio resource control (RRC) connection with a network entity, wherein the at least one PUR includes one or more distinct PUR occasions, wherein each of the one or more distinct PUR occasions is associated with different time resources;
receive an indication of one or more different synchronization signal blocks (SSBs) respectively associated with the one or more distinct PUR occasions; and
transmit information during a first PUR occasion, of the one or more distinct PUR occasions, that is associated with a first SSB, of the one or more different SSBs, that is associated with a reference signal received power (RSRP) that is greater than a threshold.

9. The UE of claim 8, the at least one memory further storing processor-readable code that, when executed by the at least one processor in conjunction with at least one modem, is configured to:
measure a respective RSRP associated with each SSB of the one or more different SSBs; and
select, associated with the first SSB having the associated RSRP greater than the threshold, the first SSB from the one or more different SSBs.

10. The UE of claim 8, wherein the information transmitted during the first PUR occasion is transmitted using a transmission beam that has a beam correspondence with a beam associated with the first SSB.

11. The UE of claim 8, the at least one memory further storing processor-readable code that, when executed by the at least one processor in conjunction with at least one modem, is configured to:

receive an indication of a search space associated with a control resource set that the UE is to monitor for a response from the network entity; and monitor, after transmitting the information during the first PUR occasion, the search space associated with the control resource set for the response from the network entity, wherein the response is associated with the information transmitted during the first PUR occasion.

12. The UE of claim 8, the at least one memory further storing processor-readable code that, when executed by the at least one processor in conjunction with at least one modem, is configured to receive, in a configuration message, at least one of the indication of the at least one PUR, the indication of the one or more different SSBs, or an indication of a search space associated with a control resource set that the UE is to monitor for a response from the network entity.

13. The UE of claim 11, the at least one memory further storing processor-readable code that, when executed by the at least one processor in conjunction with at least one modem, is configured to:

start at least one timer associated with monitoring of the search space; and initiate, associated with the UE not receiving the response prior to expiration of the at least one timer, a random access channel operation to transmit the information.

14. The UE of claim 8, wherein the information transmitted during the first PUR occasion is transmitted while the UE does not have the RRC connection with the network entity.

15. A method for wireless communication performed by a network entity, comprising:

transmitting an indication of at least one preconfigured uplink resource (PUR) allocated for uplink communication when a user equipment (UE) does not have a radio resource control (RRC) connection with the network entity, wherein the at least one PUR includes one or more distinct PUR occasions, wherein each of the one or more distinct PUR occasions is associated with different time resources;

transmitting an indication of one or more different synchronization signal blocks (SSBs) respectively associated with the one or more distinct PUR occasions; and receiving information during a first PUR occasion, of the one or more distinct PUR occasions, that is associated with a first SSB, of the one or more different SSBs, that is associated with a reference signal received power (RSRP) that is greater than a threshold.

16. The method of claim 15, further comprising:

transmitting an indication of a search space associated with a control resource set that the UE is to monitor for a response from the network entity; and transmitting, after receiving the information during the first PUR occasion, the response in the search space associated with the control resource set.

17. The method of claim 15, further comprising transmitting, in a configuration message, at least one of the indication of the at least one PUR, the indication of the one or more different SSBs, or an indication of a search space associated with a control resource set that the UE is to monitor for a response from the network entity.

18. The method of claim 15, wherein the information received during the first PUR occasion is received while the UE does not have the RRC connection with the network entity.

19. A network entity, comprising:

at least one processor; and at least one memory communicatively coupled with the at least one processor and storing processor-readable code that, when executed by the at least one processor in conjunction with at least one modem, is configured to:

transmit an indication of at least one preconfigured uplink resource (PUR) allocated for uplink communication when a user equipment (UE) does not have a radio resource control (RRC) connection with the network entity, wherein the at least one PUR includes one or more distinct PUR occasions, wherein each of the one or more distinct PUR occasions is associated with different time resources;

transmit an indication of one or more different synchronization signal blocks (SSBs) respectively associated with the one or more distinct PUR occasions; and receive information during a first PUR occasion of the one or more distinct PUR occasions, that is associated with a first SSB, of the one or more different SSBs, that is associated with a reference signal received power (RSRP) that is greater than a threshold.

20. The network entity of claim 19, the at least one memory further storing processor-readable code that, when executed by the at least one processor in conjunction with at least one modem, is configured to:

transmit an indication of a search space associated with a control resource set that the UE is to monitor for a response from the network entity; and transmit, after receiving the information during the first PUR occasion, the response in the search space associated with the control resource set.

21. The network entity of claim 19, the at least one memory further storing processor-readable code that, when executed by the at least one processor in conjunction with at least one modem, is configured to transmit, in a configuration message, at least one of the indication of the at least one PUR, the indication of the one or more different SSBs, or an indication of a search space associated with a control resource set that the UE is to monitor for a response from the network entity.

22. The network entity of claim 19, wherein the information received during the first PUR occasion is received while the UE does not have the RRC connection with the network entity.

23. The method of claim 1, wherein the indication of one or more different SSBs associated with one or more distinct PUR occasions provides an indication of a plurality of different SSBs associated with a plurality of distinct PUR occasions, wherein each PUR occasion of the plurality of distinct PUR occasions is associated with only one SSB of the plurality of different SSBs, and wherein association between the plurality of distinct PURs and the plurality of different SSBs is configured for multi-beam support for small data transfer (SDT) over PURs.

24. The method of claim 4, wherein a reception beam that has beam correspondence with a beam used for the transmitting the information during the first PUR occasion is used for monitoring the search space associated with the control resource set for the response from the network entity.

25. The method of claim 6, further comprising:

starting a first timer of the at least one timer after transmitting the information during the first PUR occasion;

starting a second timer of the at least one timer after the first timer has expired; and initiating, associated with the UE not receiving the response prior to expiration of the second timer, the random access channel operation to transmit the information.

26. The UE of claim 8, wherein the indication of one or more different SSBs associated with one or more distinct PUR occasions provides an indication of a plurality of different SSBs associated with a plurality of distinct PUR occasions, wherein each PUR occasion of the plurality of distinct PUR occasions is associated with only one SSB of the plurality of different SSBs, and wherein association between the plurality of distinct PURs and the plurality of different SSBs is configured for multi-beam support for small data transfer (SDT) over PURs.

27. The UE of claim 11, wherein a reception beam that has beam correspondence with a beam used for transmitting the information during the first PUR occasion is used for monitoring the search space associated with the control resource set for the response from the network entity.

28. The UE of claim 13, the at least one memory further storing processor-readable code that, when executed by the at least one processor in conjunction with at least one modem, is configured to:

start a first timer of the at least one timer after transmitting the information during the first PUR occasion;

start a second timer of the at least one timer after the first timer has expired; and initiate, associated with the UE not receiving the response prior to expiration of the second timer, the random access channel operation to transmit the information.

29. The method of claim 15, wherein the indication of one or more different SSBs associated with one or more distinct PUR occasions provides an indication of a plurality of different SSBs associated with a plurality of distinct PUR occasions, wherein each PUR occasion of the plurality of distinct PUR occasions is associated with only one SSB of the plurality of different SSBs, and wherein association between the plurality of distinct PURs and the plurality of different SSBs is configured for multi-beam support for small data transfer (SDT) over PURs.

30. The method of claim 15, wherein the indication of the at least one PUR is transmitted without the network entity having received a UE request for uplink resources.

31. The method of claim 16, further comprising:

transmitting a value for at least one timer associated with monitoring of the search space by the UE, wherein the value for the at least one timer is configured for the UE initiating a random access channel operation to transmit the information.

32. The network entity of claim 19, wherein the indication of one or more different SSBs associated with one or more distinct PUR occasions provides an indication of a plurality of different SSBs associated with a plurality of distinct PUR occasions, wherein each PUR occasion of the plurality of distinct PUR occasions is associated with only one SSB of the plurality of different SSBs, and wherein association between the plurality of distinct PURs and the plurality of different SSBs is configured for multi-beam support for small data transfer (SDT) over PURs.

33. The network entity of claim 19, wherein the indication of the at least one PUR is transmitted without the network entity having received a UE request for uplink resources.

34. The network entity of claim 20, the at least one memory further storing processor-readable code that, when executed by the at least one processor in conjunction with the at least one modem, is configured to:

transmit a value for at least one timer associated with monitoring of the search space by the UE, wherein the value for the at least one timer is configured for the UE initiating a random access channel operation to transmit the information.

\* \* \* \* \*